(12) United States Patent
Bing

(10) Patent No.: US 9,713,960 B2
(45) Date of Patent: Jul. 25, 2017

(54) ON-BOARD CHARGER HOUSEKEEPING POWER SUPPLY WITH AUTOMATIC SOURCE TRANSITION

(71) Applicant: Lear Corporation, Southfield, MI (US)

(72) Inventor: Zhonghui Bing, Canton, MI (US)

(73) Assignee: Lear Corporation, Southfield, MI (US)

( * ) Notice: Subject to any disclaimer, the term of this patent is extended or adjusted under 35 U.S.C. 154(b) by 584 days.

(21) Appl. No.: 14/463,321

(22) Filed: Aug. 19, 2014

(65) Prior Publication Data

US 2015/0084415 A1 Mar. 26, 2015

Related U.S. Application Data

(60) Provisional application No. 61/882,933, filed on Sep. 26, 2013.

(51) Int. Cl.
*B60L 11/18* (2006.01)
*B60L 3/00* (2006.01)

(52) U.S. Cl.
CPC ......... *B60L 11/1809* (2013.01); *B60L 3/0046* (2013.01); *B60L 3/0092* (2013.01);
(Continued)

(58) Field of Classification Search
CPC .. H02M 1/08; H02M 1/36; H02M 2001/0032; H02M 2001/007; Y02B 70/126; Y02B 70/16
See application file for complete search history.

(56) References Cited

U.S. PATENT DOCUMENTS 5,436,820 A 7/1995 Furmanczyk
5,633,577 A 5/1997 Matsumae et al.
(Continued)

FOREIGN PATENT DOCUMENTS

AT 405227 B 6/1999
CN 102412604 A 4/2012
(Continued)

OTHER PUBLICATIONS

German Patent and Trademark Office, Office Action for the corresponding German Patent Application No. 10 2014 219 478.4 dated Oct. 24, 2016.

(Continued)

*Primary Examiner* — Thienvu Tran
*Assistant Examiner* — David M Stables
(74) *Attorney, Agent, or Firm* — Brooks Kushman P.C.

(57) ABSTRACT

A power supply system and method for providing uninterrupted low voltage electrical power to control circuitry in an electric or hybrid-electric vehicle. A transformer includes a first primary side configured to receive a low voltage input from a vehicle battery and a second primary side configured to receive a rectified AC high voltage input. A first controller coupled to the low voltage input is operational to drive a first switching device to regulate a low voltage output using energy from the low voltage input when the rectified AC high voltage input is absent. A second controller connectable to the rectified AC high voltage input is operational to drive a second switching device to regulate the low voltage output using energy from the rectified AC high voltage input and deactivate or activate the first controller using a switching signal when the rectified AC high voltage input is present or absent, respectively.

20 Claims, 4 Drawing Sheets

(52) U.S. Cl.
CPC ....... *B60L 11/1868* (2013.01); *Y02T 10/7005* (2013.01); *Y02T 10/7066* (2013.01); *Y02T 10/7072* (2013.01); *Y02T 90/14* (2013.01)

(56) References Cited

U.S. PATENT DOCUMENTS

| | | |
|---|---|---|
| 6,509,724 B1 | 1/2003 | Ilic et al. |
| 8,203,232 B2 | 6/2012 | Pino et al. |
| 8,692,512 B2 | 4/2014 | Tanikawa et al. |
| 9,211,798 B2 | 12/2015 | Hampo et al. |
| 2008/0316774 A1 | 12/2008 | Ito et al. |
| 2011/0140512 A1 | 6/2011 | Pino et al. |
| 2012/0068663 A1 | 3/2012 | Tanikawa et al. |
| 2012/0314462 A1* | 12/2012 | Sweet ............... H02M 1/36 363/49 |
| 2013/0026827 A1 | 1/2013 | Hampo et al. |
| 2014/0160805 A1* | 6/2014 | Oh ............... H02M 3/33507 363/21.02 |
| 2014/0362605 A1* | 12/2014 | Jang ............... H02M 3/3353 363/17 |

FOREIGN PATENT DOCUMENTS

| | | |
|---|---|---|
| CN | 102897119 A | 1/2013 |
| DE | 102010062038 A1 | 6/2011 |
| DE | 102010006125 A1 | 8/2011 |
| EP | 1962415 A2 | 8/2008 |

OTHER PUBLICATIONS

The State Intellectual Property Office of People's Republic of China, First Office Action for the corresponding Chinese Patent Application No. 2014104941269 dated Jun. 22, 2016.

The State Intellectual Property Office of People's Republic of China, English Translation for the 1st Chinese Office Action for corresponding Chinese Patent Application No. 2014104941269 dated Jun. 22, 2016.

Ho-Sung Kim et al.; Analysis and Design of a Multi-output Converter using Asymmetrical PEM Half-bridge Flyback Converter Employing a Parallel-series Transformer; Copyright 2011 IEEE; pp. 1-11.

Liyu Yang et al.; Design of a Transition Mode Controller for Flyback Converters; North Carolina State University; Nov. 2009 IEEE; pp. 1188-1193.

* cited by examiner

ON-BOARD CHARGER HOUSEKEEPING POWER SUPPLY WITH AUTOMATIC SOURCE TRANSITION

CROSS-REFERENCE TO RELATED APPLICATIONS

This application is a Non-Provisional of U.S. application Ser. No. 61/882,933 filed Sep. 26, 2013, the disclosure of which is hereby incorporated in its entirety by reference herein.

TECHNICAL FIELD

The present disclosure is directed to a dual source, housekeeping power supply system and method for use in an electric or hybrid-electric vehicle for providing uninterrupted low voltage electrical power to control circuitry and, in particular, a housekeeping power supply for an on-board battery charger with automatic source transition upon the application or removal of AC voltage to the charger.

BACKGROUND

As is well known in the automobile industry, electric vehicles (EV) and hybrid-electric vehicles (HEV) may be provided with one or more high voltage batteries for powering the vehicle drivetrain. Such batteries require periodic re-charging after depletion, which may be accomplished by connecting the vehicle to a high voltage AC power line, which may be 120 or 240 volt AC, supplied by an electric utility grid. Such a connection may utilize a suitable vehicle connector configured to interface with a vehicle on-board battery charger (OBC). The OBC converts the grid AC power into appropriate DC power to charge the high voltage batteries. In order to perform the basic power conversions, all circuit components need to be powered by individual supplies in each isolated ground zone. This is done by Housekeeping Power Supplies (HKPS).

Electric and hybrid-electric vehicles may also include a low voltage battery, such as a 12 volt DC battery, for powering low voltage vehicle electrical systems and circuitry. Some or all of such electrical systems and/or circuitry of an EV or HEV could be supplied with energy from a high voltage power source when the vehicle is connected to an AC power line. In that event, such a power source is virtually unlimited and such an arrangement would help preserve the charge and/or extend the life of the vehicle 12 volt DC battery. In the absence of the vehicle connection to the AC power line, certain control circuitry could be supplied with sufficient power from the vehicle 12 volt DC battery to perform various diagnostic functions and/or to permit reprogramming of that control circuitry, such as re-flashing for software updates.

Such an arrangement typically requires two flyback transformers to individually regulate the AC power and the 12 volt battery power. The two transformers will never operate at the same time, resulting in an inefficient usage of materials and printed circuit board (PCB) space. Moreover, it requires seamlessly switching between AC power and the vehicle 12 volt DC battery, depending upon the presence or absence of the vehicle connection to the high voltage AC power line. Such switching may be accomplished using an auxiliary flyback converter to convert 12 volt DC to resemble the AC power at the minimum voltage level. When the AC power line comes alive, the flyback converter feedback will saturate and the converter will enter into a low power mode. Once the AC power is removed, the feedback will go out of saturation and the converter will resume its normal operation mode. The use of such an auxiliary flyback converter is bulky and costly, inefficient because all parts are running, and less reliable since both sides are tied together leading to a possible failure that can cause excessive high voltage. Other solutions include two separate flyback converters with shared outputs. A system microcontroller is employed to detect the state of AC power and then enable/disable one of the two converters. However, the microcontroller timing becomes critical and cannot meet the requirement for seamless transitions in most of the cases.

SUMMARY

One or more embodiments of the present disclosure are directed to a power supply system for providing uninterrupted low voltage electrical power to control circuitry in an electric or hybrid-electric vehicle. The system may include a transformer configured to receive at least one of a low voltage input from a vehicle battery and a rectified AC high voltage input and convert one of the low voltage input and the rectified AC high voltage input to a low voltage output for use in powering the control circuitry. The transformer may include a first primary side configured to receive the low voltage input from the vehicle battery and a second primary side configured to receive the rectified AC high voltage input. The system may further include a first controller coupled to the low voltage input for operating a first switching device associated with the first primary side of the transformer. The first controller may be operational to drive the first switching device to regulate the low voltage output using energy from the low voltage input when the rectified AC high voltage input is absent. The system may also include a second controller connectable to the rectified AC high voltage input for operating a second switching device associated with the second primary side of the transformer. When the rectified AC high voltage input is present, the second controller may be operational to drive the second switching device to regulate the low voltage output using energy from the rectified AC high voltage input and deactivate the first controller using a switching signal. An opto-coupler may be provided in communication with the second controller for receiving the switching signal and transmitting the switching signal from the second primary side across an isolation boundary to the first controller on the first primary side.

The system may further include monostable circuit electrically disposed between the opto-coupler and the first controller. The monostable circuit may be configured to receive the switching signal from the opto-coupler and transmit an output to the first controller based on the switching signal. The monostable circuit may be a retriggerable monostable digital circuit having one of two states based on the switching signal. The output from the monostable circuit is based on the one of two states. The first controller may be deactivated when the switching signal from the second controller, transmitted across the isolation boundary by the opto-coupler to the monostable circuit, is a trigger pulse.

The transformer may be an isolated flyback transformer. Further, the first controller and the second controller may each be flyback converter controllers. The first switching device and the second switching device may be MOSFETs. Moreover, the second controller may have a setpoint less than a minimum value of the rectified AC high voltage input so that it is deactivated when the rectified AC high voltage input is absent.

One or more additional embodiments of the present disclosure are also directed to a power supply system for providing uninterrupted low voltage electrical power to control circuitry in an electric or hybrid-electric vehicle. The system may include a transformer having a first primary side configured to receive a low voltage input from a vehicle battery and a second primary side configured to receive a rectified AC high voltage input. The system may also include a first controller coupled to the low voltage input. The first controller may be operational to drive a first switching device to regulate a low voltage output using energy from the low voltage input when the rectified AC high voltage input is absent. The system may further include a second controller connectable to the rectified AC high voltage input. When the rectified AC high voltage input is present, the second controller may be operational to drive a second switching device to regulate the low voltage output using energy from the rectified AC high voltage input and deactivate the first controller using a switching signal.

The system may further include an opto-coupler in communication with the second controller for receiving the switching signal and transmitting the switching signal from the second primary side across an isolation boundary to the first controller on the first primary side. Moreover, a monostable circuit may be electrically disposed between the opto-coupler and the first controller. The monostable circuit may be configured to receive the switching signal from the opto-coupler and transmit an output to the first controller based on the switching signal. The monostable circuit may be a retriggerable monostable digital circuit having one of two states based on the switching signal. The output from the monostable circuit is based on the one of two states. The first controller may be deactivated when the switching signal from the second controller, transmitted across the isolation boundary by the opto-coupler to the monostable circuit, is a trigger pulse.

The transformer may be an isolated flyback transformer. Further, the first controller and the second controller may each be flyback converter controllers. The first switching device and the second switching device may be MOSFETs. Moreover, the second controller may have a setpoint less than a minimum value of the rectified AC high voltage input so that it is deactivated when the rectified AC high voltage input is absent.

Yet one or more additional embodiments of the present disclosure are directed to a method for providing uninterrupted low voltage electrical power to control circuitry in an electric or hybrid-electric vehicle. The method may include receiving a low voltage input from a vehicle battery at a first primary side of a transformer and converting the low voltage input to a low voltage output for use in powering the control circuitry. The method may further include receiving a rectified AC high voltage input at a second primary side of the transformer, converting the rectified AC high voltage input to the low voltage output for use in powering the control circuitry when the rectified AC high voltage input is present, and deactivating the first primary side of the transformer so that it stops converting the low voltage input to a low voltage output.

The method may also include activating a first controller to drive a first switching device to regulate the low voltage output using energy from the low voltage input when the rectified AC high voltage input is absent. Additionally, deactivating the first primary side of the transformer so that it stops converting the low voltage input to the low voltage output may include transmitting a switching signal from a second controller across an isolation boundary to the first controller when the rectified AC high voltage input is present and deactivating the first controller in response to the switching signal so that it stops driving the first switching device. The second controller may be connectable to the rectified AC high voltage input for operating a second switching device associated with the second primary side of the transformer.

DETAILED DESCRIPTION

Figure 1:
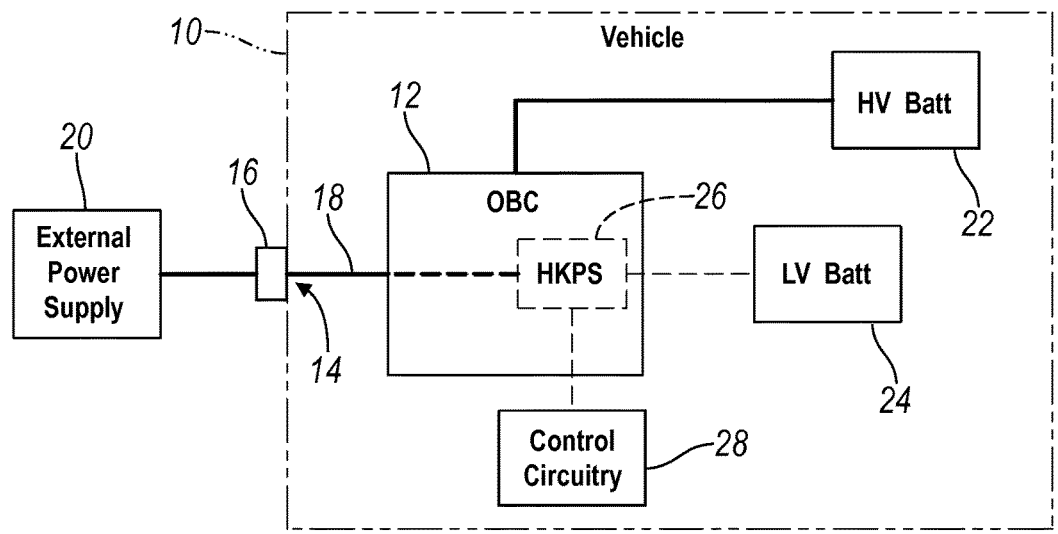
FIG. 1 is a simplified, exemplary system diagram of an electric or hybrid-electric vehicle including an on-board battery charger having a housekeeping power supply system, in accordance with one or more embodiments of the present disclosure.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

With reference to FIGS. 1-4, a power supply system for use in an electric or hybrid-electric vehicle for providing uninterrupted low voltage electrical power to control circuitry in the vehicle, and a method for providing uninterrupted low voltage electrical power to control circuitry in an electric or hybrid-electric vehicle will be described. For ease of illustration and to facilitate understanding, like reference numerals may be used herein for like components and features throughout the drawings.

As previously discussed, EV and HEV high voltage batteries for powering the vehicle drivetrain require periodic re-charging after depletion. Such re-charging may be accomplished by connecting the vehicle to a high voltage AC power line, which may be 120 or 240 volt AC, supplied by an electric utility grid using a suitable vehicle connector configured to interface with a vehicle on-board battery charger (OBC).

As also discussed, EV and HEV low voltage batteries, such as a 12 volt DC battery, may provide power to low voltage vehicle electrical systems and circuitry. Some or all of such EV or HEV electrical systems and/or circuitry could be supplied power by a power supply system from a high voltage power source when the vehicle is connected to a high voltage AC power line. In that event the power source is virtually unlimited and such an arrangement would help preserve the charge and/or extend the life of the vehicle 12 volt DC battery. In the absence of the vehicle connection to the high voltage AC power line, certain control circuitry could be provided with sufficient power by the power supply system from the vehicle 12 volt DC battery to perform various diagnostics and/or to permit reprogramming of that control circuitry.

Such an arrangement, however, requires switching between the high voltage power source and the vehicle 12 volt DC battery, depending upon the presence or absence of the vehicle connection to the high voltage AC power line. That switching may be accomplished using one of the approaches described above, but such prior approaches add bulk and cost to the EV or HEV and increase the possibility of circuitry, component and/or system failures.

There is therefore a need for a power supply system and method, which could be implemented as part of a vehicle on-board charger (OBC), for providing uninterrupted low voltage electrical power to control circuitry in an EV or HEV. Such a system and method would provide low voltage power for control circuitry from a high voltage power source when the high voltage power source is present, and would provide such low voltage power from the low voltage vehicle battery when the high voltage power source is absent. Such a system and method would also provide robust, fast and reliable operation, without using multiple transformers and additional microcontroller-based supervision circuitry.

In general, according to embodiments disclosed herein, a vehicle OBC may be provided with a power supply system that accepts energy from two sources, namely, a rectified high voltage AC input from a high voltage AC power source and a low voltage input from the vehicle low voltage battery. The power supply system and method may provide uninterrupted power so that control circuitry, which may be associated with the vehicle OBC, may be re-programmed and perform diagnostic and communication functions even when only the low voltage input from the vehicle low voltage battery is applied. Otherwise, the power supply system and method may provide power to such control circuitry from the high voltage power source when it is available. The transition between the high voltage AC power source and the vehicle low voltage battery may occur automatically, seamlessly and reliably. The power supply system and method may be referred to as a housekeeping power supply.

Referring now to FIG. 1, a simplified, exemplary system diagram of an electric or hybrid-electric vehicle 10 is shown including an on-board battery charger (OBC) 12. The vehicle 10 may include a charging inlet 14 for connecting a charging cable connector 16 to a vehicle harness 18. The charging cable connector 16 may extend from an external power supply 20 for providing electrical energy to the vehicle from an AC power line. The vehicle harness 18 may connect to the OBC 12. In turn, the OBC 12 may connect to one or more energy storage devices, such as a high voltage battery 22 and a low voltage battery 24, for storing the electrical energy by charging the energy storage devices. The OBC 12 may facilitate and manage the process of charging the energy storage devices, particularly the high voltage battery 22, from the vehicle side. The OBC 12 may include a housekeeping power supply system 26 for providing uninterrupted low voltage electrical power to control circuitry 28 in the vehicle 10.

Figure 2:
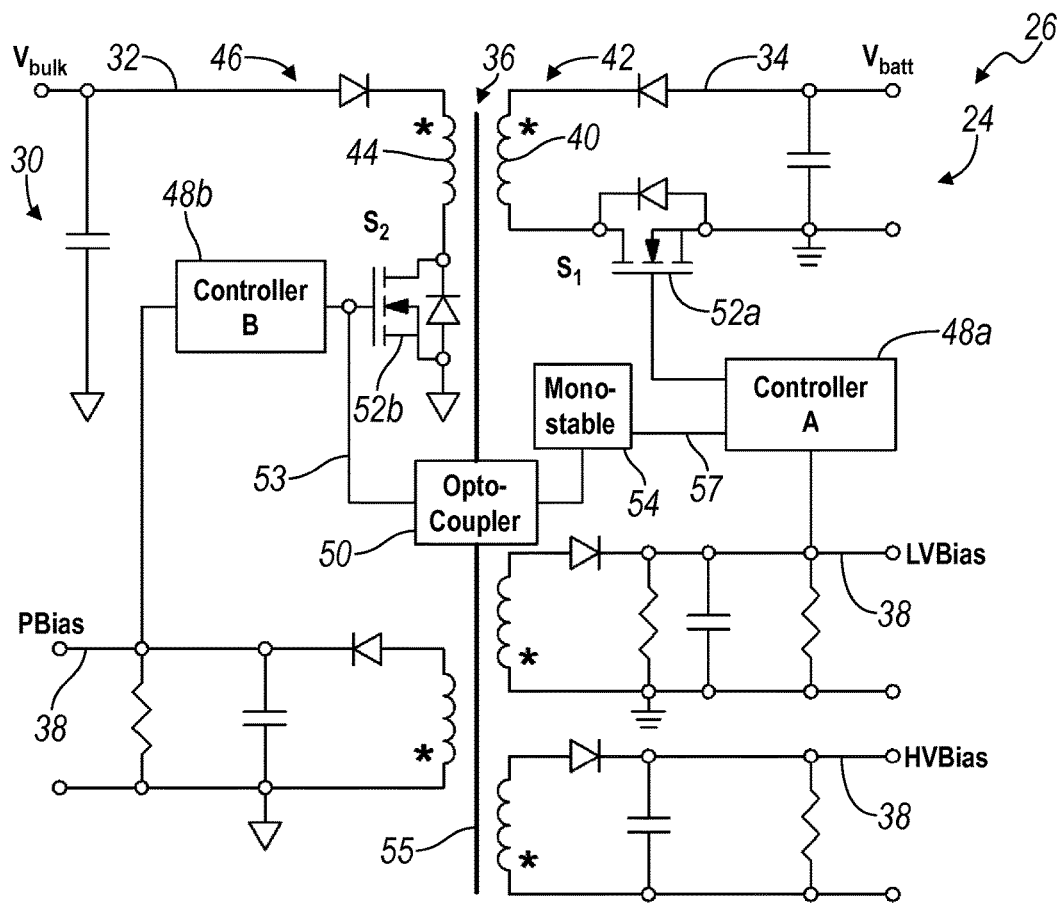
FIG. 2 is a schematic diagram of an exemplary housekeeping power supply system for use in an electric or hybrid-electric vehicle, in accordance with one or more embodiments of the present disclosure.

Referring now to FIG. 2, a simplified schematic diagram is shown of an exemplary housekeeping power supply system 26 for use in an electric or hybrid-electric vehicle. In that regard, as previously described, the housekeeping power supply system 26 is configured to provide uninterrupted low voltage electrical power to control circuitry 28 in the vehicle 10.

As seen in FIG. 2, the housekeeping power supply system 26 may be a dual source power supply with automatic source transition. In a first mode, the housekeeping power supply system 26 may accept power from a bulk power source 30, $V_{bulk}$, in the form of a rectified AC high voltage input 32. In that regard, the bulk power source 30 may comprise a rectifier and may produce the rectified AC high voltage input 32 by rectifying an AC high voltage input received from an AC power line (not shown). In a second mode, the housekeeping power supply system 26 may accept power from a low voltage battery input 34 from the vehicle low voltage battery 24, $V_{batt}$, such as a 12 volt DC battery.

The two input sources, $V_{bulk}$ and $V_{batt}$, may share a same transformer 36 for converting either the rectified AC high voltage input 32 or the low voltage battery input 34 to a low voltage output 38, which may be a 5 volt DC output, for use in powering the control circuitry (not shown). More specifically, the low voltage output 38 may be produced by the transformer 36 from the rectified AC high voltage input 32 when the rectified AC high voltage input 32 is applied to the OBC 12. Alternatively, when the rectified AC high voltage input 32 is absent, the low voltage output 38 may be produced by the transformer 36 from the low voltage battery input 34. According to one or more embodiments, the transformer 36 may be an isolated flyback transformer and may include at least a first primary winding 40 associated with a first primary side 42 and a second primary winding 44 associated with a second primary side 46.

The housekeeping power supply system 26 may be provided with a pair of flyback converter controllers 48a,b (analog or digital) and an opto-coupler 50. Controller B (48b) may be operational when the AC high voltage input 32 is applied to the OBC 12, whereas Controller A (48a) may be operational when the AC high voltage input 32 is absent from the input to the OBC 12. Controller A may drive a corresponding switching device 52a, such as MOSFET $S_1$ Likewise, Controller B may drive its own switching device 52b, such as MOSFET $S_2$. The opto-coupler 50 may be in communication with Controller B for transmitting a switching signal 53 from Controller B across the transformer's isolation boundary 55 to a monostable circuit 54. The monostable circuit 54 may be a retriggerable monostable digital circuit having two states. As is known in the art, one of the states is stable, while the other state is unstable (or transient). A trigger pulse may cause the monostable circuit 54 to enter the unstable state. Typically, after entering the unstable state, the circuit will return to the stable state after a set time. However, as long as the triggering pulse repeats, the monostable circuit 54 will stay in the unstable state. The output 57 from the monostable circuit 54 may be received by Controller A.

In this manner, Controller B may be provided in communication with the output of the bulk power source 30 (i.e., the rectified AC high voltage input 32), and may be designed with a setpoint less than the minimum value of the rectified AC high voltage input 32. As a result, in the absence of the rectified AC high voltage input 32 at the input of the OBC 12, the Controller B may not be operational. When the rectified AC high voltage input 32 is not present, the housekeeping power supply system 26 may operate in a Low Voltage (LV) mode such that energy is accepted from the low voltage battery 24, $V_{batt}$, at the low voltage battery input 34.

Figure 3:
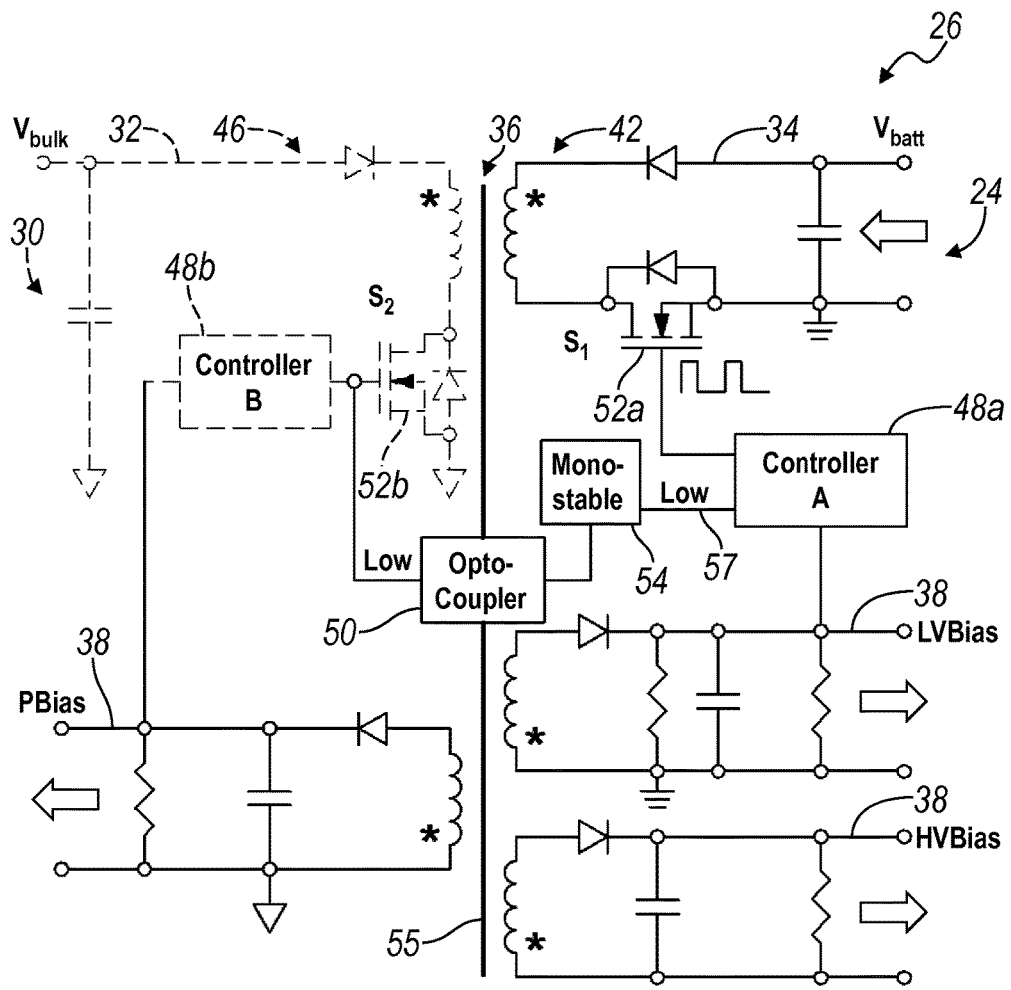
FIG. 3 is a schematic diagram of the housekeeping power supply system of FIG. 2 in a low voltage (LV) mode, in accordance with one or more embodiments of the present disclosure.

In the LV mode, as illustrated in FIG. 3, Controller B may not be operational as set forth previously. As a result, during steady-state operation, MOSFET $S_2$ may not be switching (e.g., remains OFF) and minimal power may be drawn from the bulk power source 30, $V_{bulk}$. Further, Controller B's output to the opto-coupler 50, switching signal 53, may remain LOW. The LOW input to the opto-coupler 50 may be transmitted across the isolation boundary 55 to the monostable circuit 54. During steady-state operation, the input to the monostable circuit 54 may remain constant (e.g., LOW). This may maintain the monostable circuit 54 in the stable state, such that the output from the monostable circuit 54 may also be LOW. The LOW output from the monostable circuit 54 may be received by Controller A (48a). As a result, Controller A may be operational and may control MOSFET $S_1$ with a pulse-width modulated (PWM) signal to regulate the low voltage output 38 of the transformer 36.

Figure 4:
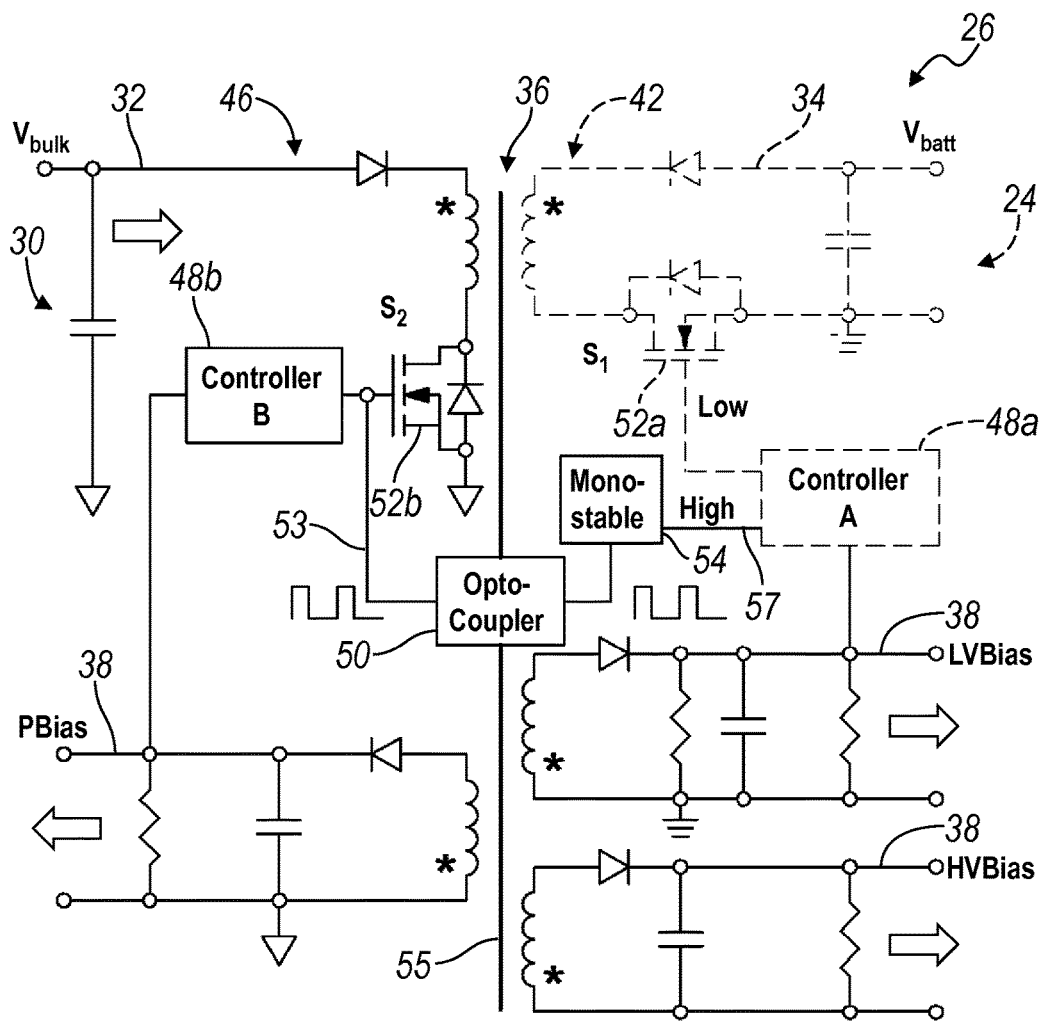
FIG. 4 is a schematic diagram of the housekeeping power supply system of FIG. 2 in an AC mode, in accordance with one or more embodiments of the present disclosure.

When the rectified AC high voltage input 32 is applied to the OBC 12, the housekeeping power supply system 26 may operate in an AC mode, as illustrated in FIG. 4. In the AC mode, the output from the bulk power source 30 may be above the high voltage setpoint, thereby activating Controller B. When Controller B is operational, it may output PWM signals to drive MOSFET $S_2$ ON and OFF for regulating the low voltage output 38 from the transformer 36. Concurrently, the PWM drive signal from Controller B may operate as switching signal 53 and be transferred by the opto-coupler 50 across the isolation boundary 55 to the monostable circuit 54. The PWM signal received by the monostable circuit 54 may trigger the transient state. Accordingly, the output from the monostable circuit 54 may be HIGH, which, in turn, may disable the operation of Controller A. When Controller A is not operational, its output to MOSFET $S_1$ may be LOW such that MOSFET $S_1$ is not switching. In this manner, no power may be drawn from the vehicle low voltage battery 24, $V_{batt}$, thereby preserving its charge.

In such a fashion, the housekeeping power supply system 26 and method may have the ability to operate from two sources, as well as the ability to preferentially select which source is used (i.e., the rectified high voltage AC input 32). The housekeeping power supply system 26 and method may also draw very low current from the secondary source (i.e., the low voltage battery input 34) when the primary source (i.e., the rectified high voltage AC input 32) is available.

Figure 5:
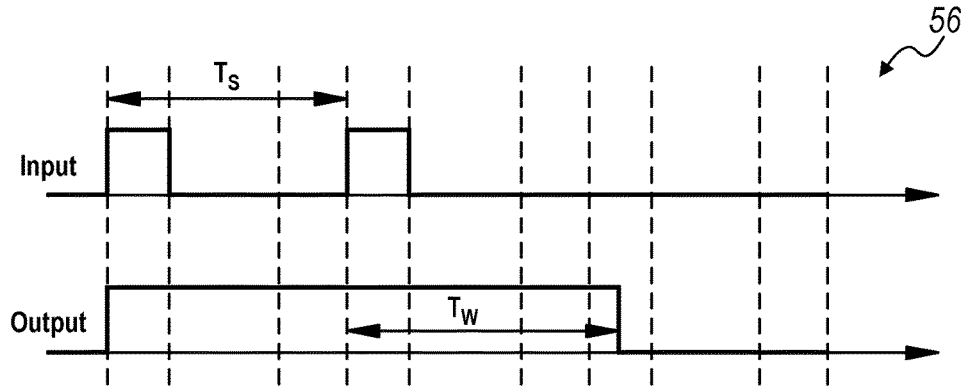
FIG. 5 is a simplified, exemplary timing diagram showing input and output signals of a monostable circuit for illustrating a transition from AC mode to LV mode, in accordance with one or more embodiments of the present disclosure.

FIG. 5 is a simplified, exemplary timing diagram 56 of a mode transition, in accordance with one or more embodiments of the present disclosure. A mode transition may refer to the power source switching from the low voltage battery input 34 (LV mode) to the bulk power source 30 (AC mode), or vice-versa, when the rectified AC high voltage input 32 is present or absent. In accordance with one or more embodiments of the present disclosure, when a mode transition occurs, the low voltage output 38 from the housekeeping power supply system 26 may not be interrupted.

As previously described, in the LV mode, Controller B may be off and, thus, may not be generating PWM signals. Accordingly, the output 57 to the monostable circuit 54 may stay LOW. Once the rectified AC high voltage input 32 is applied to the OBC 12, Controller B may be activated to output PWM drive signals. At the same time, the PWM drive signals may be transferred to the monostable circuit 54 by the opto-coupler 50. As a result, the output 57 of the monostable circuit 54 may flip to HIGH and disable the operation of Controller A. According to one or more embodiments, the mode transition process may take less than one switching cycle. Once the mode transition is complete, the housekeeping power supply system 26 may operate in the AC mode.

In AC mode, the PWM signal transferred to the input of the monostable circuit 54 by the opto-coupler 50 may remain the normal pulse period with a minimum duty cycle. As a result, the monostable circuit output 57 may remain HIGH. After the rectified AC high voltage input 32 is turned off or otherwise removed from the OBC 12, Controller B may stop running and its PWM output may turn off. As shown in the timing diagram 56, after $T_w$ (e.g., approx. 1.1-1.5 times the input period, $T_s$) without another pulse coming in, the monostable circuit output 57 may flip to LOW activating Controller A. Once this mode transition is complete, the housekeeping power supply system 26 may operate in the LV mode.

As is readily apparent, then, when the rectified AC high voltage input 32 is produced by the bulk power source 30 as a result of a connection of the EV or HEV to a high voltage AC power line, the control circuitry 28 may be provided with electrical power via the housekeeping power supply system 26 from the bulk power source 30. Alternatively, in the absence of a connection of the vehicle 10 to a high voltage AC power line, the control circuitry 28 may still be provided with electrical power via the housekeeping power supply system 26 from the vehicle low voltage battery 24.

Thus, the housekeeping power supply system 26 may provide uninterrupted low voltage electrical power to the control circuitry 28, without regard to whether the vehicle 10 is connected to a high voltage AC power line. In such a fashion, even in the absence of a vehicle connection to a high voltage AC power line, sufficient power may still be provided to the control circuitry 28 via the housekeeping power supply system 26 for the control circuitry 28 to perform various diagnostic operations or to permit reprogramming or re-flashing of the control circuitry.

Referring back to FIGS. 2-4, it should be noted that the low voltage output 38 for use in powering the control circuitry 28 may comprise multiple, isolated low voltage outputs for use in powering multiple controllers that are part of the control circuitry (not shown). For example, one low voltage output 38 (PBias) may be provided for powering a controller (not shown) for use in primary control operations via a connector (not shown). Similarly, another low voltage output 38 (LVBias) may be provided for powering a controller (not shown) for use in low voltage control operations via another connector. Still another low voltage output 38 (HVBias) may be provided for powering a controller (not shown) for use in high voltage control operations via still another connector.

Figure 6:
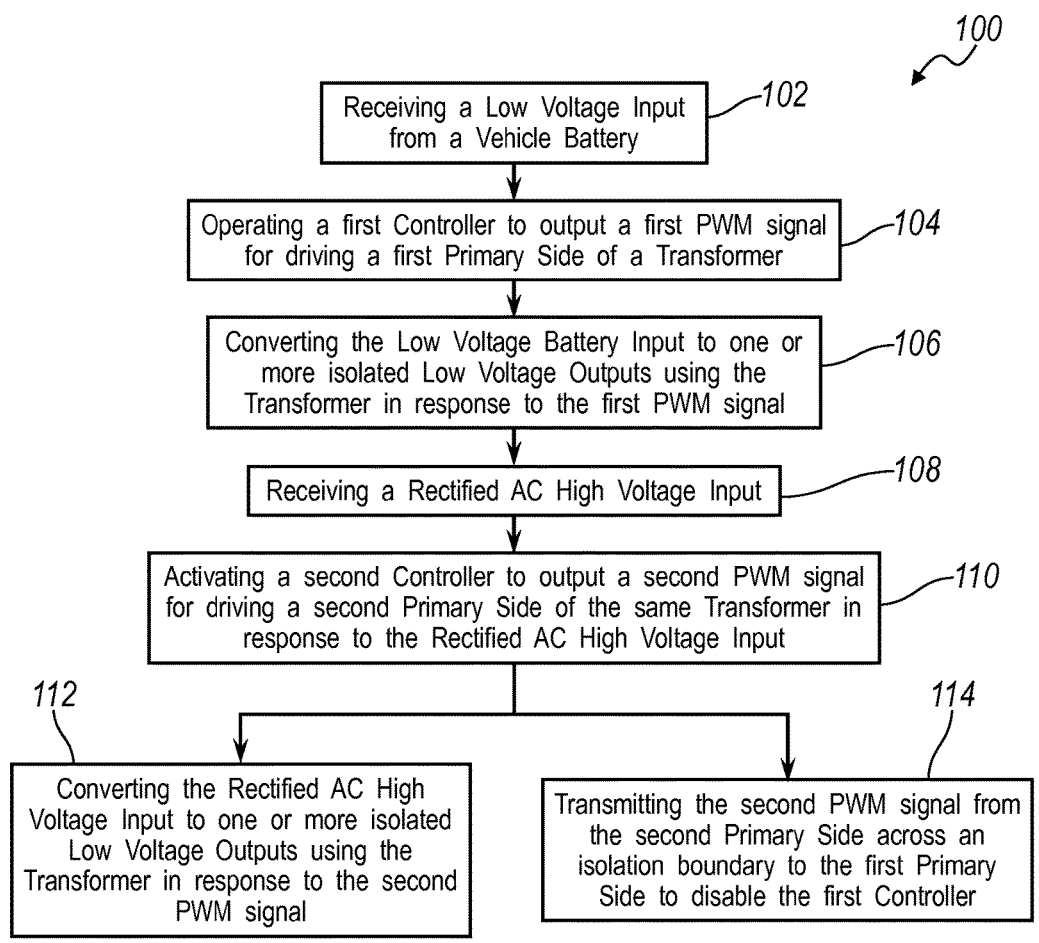
FIG. 6 is an exemplary, simplified flowchart of a method for providing uninterrupted low voltage electrical power to control circuitry in an electric or hybrid-electric vehicle, in accordance with one or more embodiments of the present disclosure.

Referring now to FIG. 6, an exemplary, simplified flowchart is shown of a method (100) for providing uninterrupted low voltage electrical power to control circuitry in an electric or hybrid-electric vehicle. As seen therein, and with continuing reference to FIGS. 2-4, the method (100) may comprise receiving (102) a low voltage input 34 from a vehicle low voltage battery 24, operating (104) a first controller 48a (e.g., Controller A) to output a first PWM signal for driving a first primary side 42 of a transformer 36, and converting (106) the vehicle battery low voltage input 34 to one or more isolated low voltage outputs 38 using the transformer 36 in response to the first PWM signal. As previously described, the transformer 36 may be an isolated flyback transformer having at least a first primary winding 40 associated with the first primary side 42 and a second primary winding 44 associated with a second primary side 46. Moreover, the first controller 48a may drive the first primary side 42 to regulate the low voltage output 38 using a first switching device 52a (e.g., MOSFET $S_1$).

The method (100) may further comprise receiving (108) a rectified AC high voltage input 32 and activating (110) a second controller 48b (e.g., Controller B) to output a second PWM signal for driving the second primary side 46 of the same transformer 36 in response to the rectified AC high voltage input 32. The method (100) may further comprise converting (112) the rectified AC high voltage input 32 to one or more isolated low voltage outputs 38 using the transformer 36 in response to the second PWM signal and transmitting (114) the second PWM signal from the second primary side 46 across an isolation boundary to the first primary side 42 to disable the first controller 48a. As previously described, the second controller 48b may drive the second primary side 46 to regulate the low voltage output 38 using a second switching device 52b (e.g., MOSFET $S_2$). The second PWM signal may be transmitted across the isolation boundary by an opto-coupler 50. Further, a monostable circuit 54 may be provided in communication with the opto-coupler 50 and the first controller 48a. In this manner, the monostable circuit 54 may receive the second PWM signal from the opto-coupler 50, which, in turn, may trigger the monostable circuit 54 causing its output to become HIGH. The HIGH output from the monostable circuit 54 may disable the first controller 48a so that it is not operational. As a result, the first controller 48a may cease outputting the first PWM signal for driving the first primary side 42 of the transformer 36. Consequently, no power may be drawn from the vehicle low voltage battery 24 until the bulk power source 30 is removed.

It should also be noted that the steps of the method (100) may be performed in an order other than that illustrated and described herein, which order is exemplary only, including the performance of one or more of the steps simultaneously.

As is readily apparent from the foregoing description, a housekeeping power supply system and method are disclosed for providing uninterrupted low voltage electrical power to control circuitry in an EV or HEV. The system and method may be dual source, accepting energy from a high voltage power source and a low voltage vehicle battery. The system and method may provide low voltage power for control circuitry from the high voltage power source when the high voltage power source is present, such as via connection of an EV or HEV to a high voltage AC power line, and provide such low voltage power from the low voltage vehicle battery when the high voltage power source is absent. The system and method, which may implemented as part of a vehicle OBC, may switch between the high voltage power source and the low voltage vehicle battery rapidly and automatically without using multiple, bulky transformers, and with a minimal number of components in order to reduce cost and improve reliability.

While exemplary embodiments are described above, it is not intended that these embodiments describe all possible forms of the invention. Rather, the words used in the specification are words of description rather than limitation, and it is understood that various changes may be made without departing from the spirit and scope of the subject matter presented herein. Additionally, the features of various implementing embodiments may be combined to form further embodiments of the present disclosure.

What is claimed is:

1. A power supply system for providing uninterrupted low voltage electrical power to control circuitry in an electric or hybrid-electric vehicle, the system comprising:
    a transformer configured to receive at least one of a low voltage input from a vehicle battery and a rectified AC high voltage input and convert one of the low voltage input and the rectified AC high voltage input to a low voltage output for use in powering the control circuitry, the transformer including a first primary side configured to receive the low voltage input from the vehicle battery and a second primary side configured to receive the rectified AC high voltage input;
    a first controller coupled to the low voltage input for operating a first switching device associated with the first primary side of the transformer, the first controller being operational to drive the first switching device to regulate the low voltage output using energy from the low voltage input when the rectified AC high voltage input is absent;
    a second controller connected to the rectified AC high voltage input for operating a second switching device associated with the second primary side of the transformer, when the rectified AC high voltage input is present, the second controller being operational to (a) drive the second switching device to regulate the low voltage output using energy from the rectified AC high voltage input and (b) deactivate the first controller using a switching signal; and
    an opto-coupler in communication with the second controller for receiving the switching signal and transmitting the switching signal from the second primary side across an isolation boundary to the first controller on the first primary side.

2. The system of claim 1, further comprising:
    a monostable circuit electrically disposed between the opto-coupler and the first controller, the monostable circuit configured to receive the switching signal from the opto-coupler and transmit an output to the first controller based on the switching signal.

3. The system of claim 2, wherein the monostable circuit is a retriggerable monostable digital circuit having one of two states based on the switching signal, the output from the monostable circuit being based on the one of two states.

4. The system of claim 3, wherein the first controller is deactivated when the switching signal from the second controller, transmitted across the isolation boundary by the opto-coupler to the monostable circuit, is a trigger pulse.

5. The system of claim 1, wherein the transformer is an isolated flyback transformer.

6. The system of claim 5, wherein the first controller and the second controller are each flyback converter controllers.

7. The system of claim 1, wherein the first switching device and the second switching device are MOSFETs.

8. The system of claim 1, wherein the second controller has a setpoint less than a minimum value of the rectified AC high voltage input so that it is deactivated when the rectified AC high voltage input is absent.

9. A power supply system for providing uninterrupted low voltage electrical power to control circuitry in an electric or hybrid-electric vehicle, the system comprising:
- a transformer having a first primary side configured to receive a low voltage input from a vehicle battery and a second primary side configured to receive a rectified AC high voltage input;
- a first controller coupled to the low voltage input and operational to drive a first switching device to regulate a low voltage output using energy from the low voltage input when the rectified AC high voltage input is absent; and
- a second controller connected to the rectified AC high voltage input and, when the rectified AC high voltage input is present, operational to (a) drive a second switching device to regulate the low voltage output using energy from the rectified AC high voltage input and (b) deactivate the first controller using a switching signal.

10. The system of claim 9, further comprising:
- an opto-coupler in communication with the second controller for receiving the switching signal and transmitting the switching signal from the second primary side across an isolation boundary to the first controller on the first primary side.

11. The system of claim 10, further comprising:
- a monostable circuit electrically disposed between the opto-coupler and the first controller, the monostable circuit configured to receive the switching signal from the opto-coupler and transmit an output to the first controller based on the switching signal.

12. The system of claim 11, wherein the monostable circuit is a retriggerable monostable digital circuit having one of two states based on the switching signal, the output from the monostable circuit being based on the one of two states.

13. The system of claim 12, wherein the first controller is deactivated when the switching signal from the second controller, transmitted across the isolation boundary by the opto-coupler to the monostable circuit, is a trigger pulse.

14. The system of claim 9, wherein the transformer is an isolated flyback transformer.

15. The system of claim 14, wherein the first controller and the second controller are each flyback converter controllers.

16. The system of claim 9, wherein the first switching device and the second switching device are MOSFETs.

17. The system of claim 9, wherein the second controller has a setpoint less than a minimum value of the rectified AC high voltage input so that it is deactivated when the rectified AC high voltage input is absent.

18. A method for providing uninterrupted low voltage electrical power to control circuitry in an electric or hybrid-electric vehicle, the method comprising:
- receiving a low voltage input from a vehicle battery at a first primary side of a transformer;
- converting the low voltage input to a low voltage output for use in powering the control circuitry;
- receiving a rectified AC high voltage input at a second primary side of the transformer;
- converting the rectified AC high voltage input to the low voltage output for use in powering the control circuitry when the rectified AC high voltage input is present; and
- deactivating the first primary side of the transformer so that it stops converting the low voltage input to a low voltage output.

19. The method of claim 18, further comprising:
- activating a first controller to drive a first switching device to regulate the low voltage output using energy from the low voltage input when the rectified AC high voltage input is absent.

20. The method of claim 19, wherein deactivating the first primary side of the transformer so that it stops converting the low voltage input to the low voltage output comprises:
- transmitting a switching signal from a second controller across an isolation boundary to the first controller when the rectified AC high voltage input is present, the second controller connected to the rectified AC high voltage input for operating a second switching device associated with the second primary side of the transformer; and
- deactivating the first controller in response to the switching signal so that it stops driving the first switching device.

* * * * *